(12) United States Patent
Motoki

(10) Patent No.: US 11,470,219 B2
(45) Date of Patent: Oct. 11, 2022

(54) METHOD OF PUSH-TRANSMITTING INFORMATION FROM AN IMAGE PROCESSING DEVICE

(71) Applicant: SEIKO EPSON CORPORATION, Tokyo (JP)

(72) Inventor: Hidefusa Motoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/166,202

(22) Filed: Feb. 3, 2021

(65) Prior Publication Data

US 2021/0243331 A1    Aug. 5, 2021

(30) Foreign Application Priority Data

Feb. 5, 2020    (JP) .............................. JP2020-017789

(51) Int. Cl.
*H04N 1/32* (2006.01)
*G06F 3/12* (2006.01)
*H04N 1/00* (2006.01)
*G06K 15/00* (2006.01)

(52) U.S. Cl.
CPC ......... *H04N 1/32374* (2013.01); *G06F 3/121* (2013.01); *G06F 3/1204* (2013.01); *G06F 3/1229* (2013.01); *G06F 3/1285* (2013.01); *G06K 15/40* (2013.01); *H04N 1/00344* (2013.01); *H04N 1/32384* (2013.01); *H04N 1/32416* (2013.01); *H04N 1/00228* (2013.01)

(58) Field of Classification Search
None
See application file for complete search history.

(56) References Cited

U.S. PATENT DOCUMENTS

| | | | |
|---|---|---|---|
| 2006/0031906 A1* | 2/2006 | Kaneda ................ | H04N 21/437 725/113 |
| 2014/0063546 A1* | 3/2014 | Nakayama .............. | G06F 3/129 358/1.15 |
| 2019/0235815 A1* | 8/2019 | Takagi ................... | G06F 3/1285 |
| 2020/0099798 A1* | 3/2020 | Takaoka ............. | H04N 1/00244 |

FOREIGN PATENT DOCUMENTS

JP    2004-162989    6/2004

* cited by examiner

*Primary Examiner* — Miya J Williams
(74) *Attorney, Agent, or Firm* — Workman Nydegger (57) ABSTRACT

Provided is a printer connected to a management server via a network. The printer includes a storage control unit that, when an event occurs, stores in a storage unit event information indicating a content of the event that has occurred and time when the event occurs, and a transmission unit that push-transmits the event information stored in the storage unit to the management server. The storage control unit adds, to the event information, transmission information indicating whether the event information has been transmitted or has not been transmitted to the management server and stores the event information in the storage unit. Among the event information stored in the storage unit, the transmission unit push-transmits, to the management server, untransmitted event information to which transmission information indicating the event information has not been transmitted is added.

8 Claims, 6 Drawing Sheets

| EVENT INFORMATION | | | TRANSMISSION INFORMATION |
|---|---|---|---|
| EVENT ID | EVENT CODE: EVENT CONTENT | OCCURRENCE TIME | |
| 001 | E05: RUNNING OUT OF INK | 2020/02/02 09:00:00 | UNTRANSMITTED |
| 002 | C10: COMPLETION OF CLEANING PROCESSING | 2020/02/02 09:30:00 | TRANSMITTED |
| 003 | S40: POWER OFF | 2020/02/02 10:00:00 | UNTRANSMITTED |

METHOD OF PUSH-TRANSMITTING INFORMATION FROM AN IMAGE PROCESSING DEVICE

The present application is based on, and claims priority from JP Application Serial Number 2020-017789, filed Feb. 5, 2020, the disclosure of which is hereby incorporated by reference herein in its entirety.

BACKGROUND

1. Technical Field

The present disclosure relates to an image processing device and a control method of an image processing device.

2. Related Art

JP-A-2004-012599 discloses a digital multifunction machine that, when an error occurs, transmits history information including an error code and error occurrence time in response to a request from a host computer.

Since the digital multifunction machine disclosed in JP-A-2004-012599 transmits the history information in response to the request from the host computer, the host computer cannot grasp an occurrence of an error until the request is issued.

SUMMARY

An image processing device according to the present disclosure is an image processing device connected to a management server via a network. The image processing device includes a storage control unit that, when an event occurs, stores in a storage unit event information indicating a content of the event that has occurred and time when the event occurs, and a transmission unit that push-transmits the event information stored in the storage unit to the management server.

A control method of an image processing device according to the present disclosure is a method for controlling an image processing device connected to a management server via a network. The control method of an image processing device includes, when an event occurs, storing in a storage unit event information indicating a content of an event that has occurred and time when the event occurs, and push-transmitting the event information stored in the storage unit to the management server.

DESCRIPTION OF EXEMPLARY EMBODIMENTS

Figure 1:
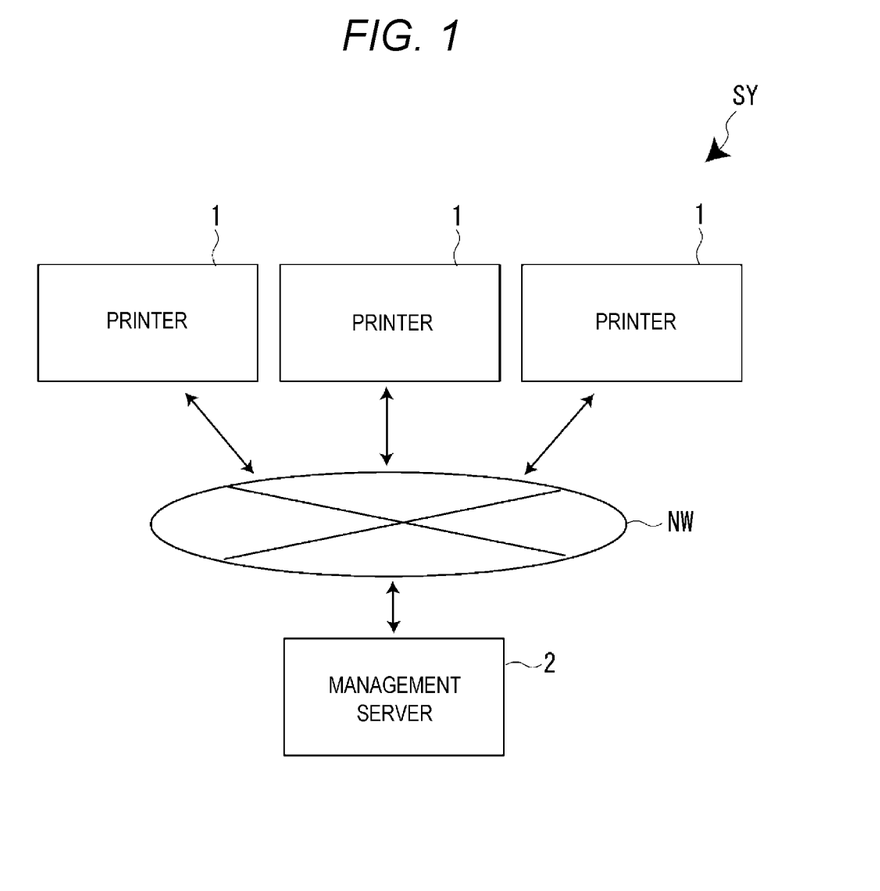
FIG. 1 is a system configuration diagram of a printer management system.

Hereinafter, an image processing device and a control method of an image processing device according to an embodiment will be described with reference to accompanying drawings. FIG. 1 is a system configuration diagram of a printer management system SY. The printer management system SY includes one or more printers 1, a management server 2, and a network NW connecting each of the printers 1 and the management server 2. The printer 1 is an example of an "image processing device". The network NW is, for example, an Internet communication network or a local area network (LAN).

The printer 1 acquires image data from an upper level device (not shown), and performs printing on a print medium such as a print sheet based on the acquired image data. The printer 1 according to the present embodiment has a sleep function of shifting to a sleep state for power saving when an operation is not performed for a predetermined time. The printer 1 according to the present embodiment is an inkjet printer, and performs printing by ejecting ink from an inkjet print head to a print medium. The printer 1 stores ink in an ink container such as an ink tank or an ink cartridge, and supplies the ink from the ink container to the print head.

The printer 1 according to the present embodiment performs a cleaning processing to prevent clogging of a nozzle provided at the print head. The cleaning processing is performed when a cleaning instruction is received from a user, or when clogging of the nozzle is detected, or is performed regularly. The printer 1 performs a flushing processing or an ink suction processing as the cleaning processing. The flushing processing is a processing of forcedly discharging ink from the nozzle during non-printing. The ink suction processing is a processing of suctioning ink from the nozzle using a suction device. The printer 1 performs cleaning processings of different intensities corresponding to the instruction from the user or a clogging state of the nozzle. For example, an ink ejection amount, the number of times of ejection, and the like are different depending on an intensity in the flushing processing. An ink suction amount, a suction force, the number of times of suctioning, and the like are different depending on an intensity in the ink suction processing.

The management server 2 is a server for managing the one or more printers 1 connected via the network NW, and acquires information from each of the printers 1. For example, the management server 2 acquires device information indicating a state of the printer 1 from the printer 1. The device information includes consumable information, actual usage information, setting information, and the like. The consumable information is information indicating a remaining amount of ink in the ink container, a remaining amount of print sheets in a sheet tray, and the like. The actual usage information is information indicating a cumulative ink consumption amount, cumulative printing time, and the like. The setting information is information indicating date and time setting, language setting, sleep shift time, and the like. The sleep shift time refers to time of shifting to the sleep state in the sleep function, that is, the above-described "predetermined time". The remaining amount of ink in the ink container, the remaining amount of print sheets in the sheet tray, the cumulative ink consumption amount, the cumulative printing time, and the like are measured by various sensors or counters. Measurement values of the various sensors or counters are stored in a measurement value storage area 12*b* (see FIG. 2) to be described later.

The management server 2 acquires event information indicating an event occurring in the printer 1 from the printer 1. The event information includes error information, cleaning information, job information, and the like. The error information is information indicating various errors such as running out of ink and running out of sheets. The cleaning information is information indicating starting of the cleaning processing, ending of the cleaning processing, an intensity of the cleaning processing, a result of the cleaning processing, and the like. The job information is information indicating a job ID of a print job, a type of a print sheet on which printing is performed based on the print job, an amount of ink used for printing based on the print job, and the like.

The management server 2 displays the device information and the event information acquired from the printer 1 on a display (not shown). Display of the device information and the event information may be performed by the management server 2, or may be performed by another terminal capable of communicating with the management server 2. In the following description, the management server 2 displays the device information and the event information on a display provided in the management server 2.

The management server 2 displays the device information and the event information in time series. Therefore, the printer 1 transmits time information included in the device information and the event information to the management server 2. More specifically, the device information of the printer 1 includes transmission time when the printer 1 transmits the device information. The event information of the printer 1 includes occurrence time when an event occurs. The printer 1 push-transmits the device information and the event information to the management server 2. The term "push-transmit" refers to that the printer 1 spontaneously transmits information to the management server 2 instead of transmitting information in response to a request from the management server 2.

Figure 2:
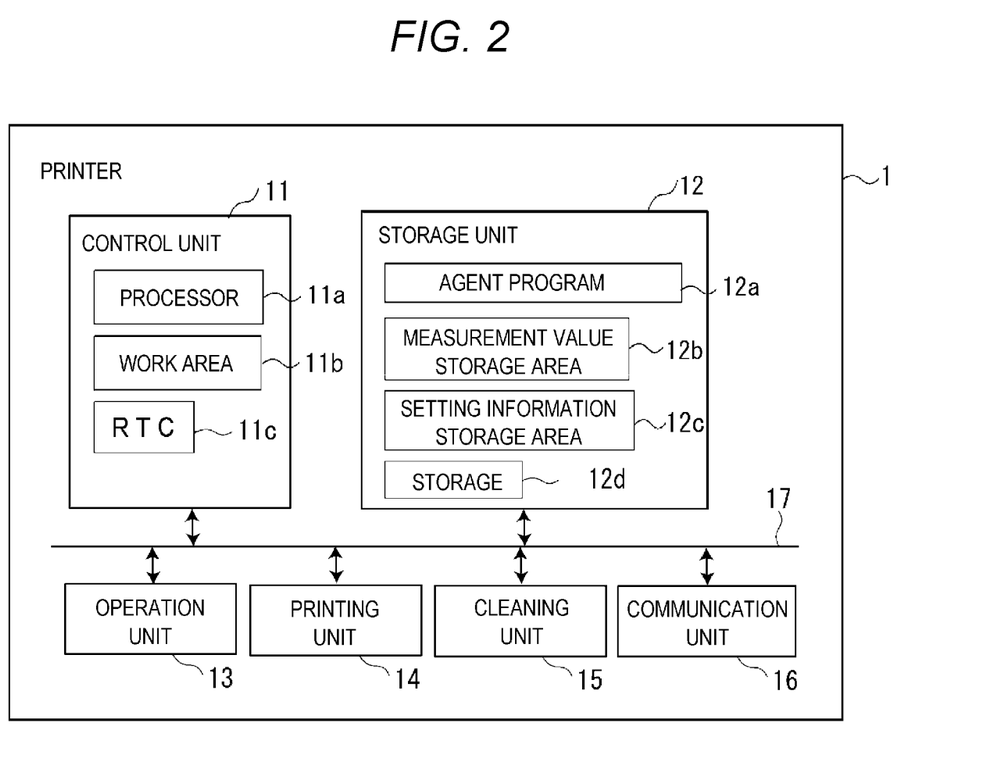
FIG. 2 is a block diagram showing a hardware configuration of a printer.

Next, a hardware configuration of the printer 1 will be described with reference to FIG. 2. The printer 1 includes a control unit 11, a storage unit 12, an operation unit 13, a printing unit 14, a cleaning unit 15, and a communication unit 16, which are connected via a bus 17.

The control unit 11 includes a processor 11a such as a central processing unit (CPU). The processor 11a controls each unit of the printer 1. The processor 11a may be a hardware circuit such as an application specific integrated circuit (ASIC) instead of the CPU. Alternatively, the processor 11a may be operated in cooperation with one or more CPUs and hardware circuits such as an ASIC.

The control unit 11 includes a work area 11b such as a random access memory (RAM). The processor 11a implements various functions to be described later in FIG. 4 by loading various programs stored in the storage unit 12 into the work area 11b and executing the programs.

The control unit 11 includes a real time clock (RTC) 11c. The RTC measures current date and time, and is used for determining event occurrence time and transmission time of the device information by the processor 11a.

The storage unit 12 is a non-volatile storage device that stores various programs and various types of data. The storage unit 12 stores an agent program 12a. The agent program 12a is a control program for the printer 1 to communicate with the management server 2. The control unit 11 executes an irregular transmission processing (see FIG. 5) and a regular transmission processing (see FIG. 6) by executing the agent program 12a. The irregular transmission processing is a processing of transmitting the event information to the management server 2 when an event occurs. The regular transmission processing is a processing of regularly transmitting the device information to the management server 2.

The storage unit 12 includes the measurement value storage area 12b. The measurement value storage area 12b stores the measurement values of various sensors or counters such as a sensor that measures a remaining amount of ink in the ink container and a counter that measures the cumulative ink consumption amount. The control unit 11 regularly stores the measurement values or stores the measurement values when the values are changed in the measurement value storage area 12b. Timing when the measurement values are stored may be different depending on measurement objects, or may be the same. The control unit 11 push-transmits information based on the measurement values stored in the measurement value storage area 12b to the management server 2 as a part of the device information.

The storage unit 12 includes a setting information storage area 12c. The setting information storage area 12c stores information set by the user using the operation unit 13. The control unit 11 push-transmits the information stored in the setting information storage area 12c to the management server 2 as a part of the device information.

The storage unit 12 includes a storage 12d. The storage 12d is a storage area for storing the event information. When an event such as an error occurs, the control unit 11 stores the event information indicating the event that has occurred in the storage 12d. The control unit 11 push-transmits the event information stored in the storage 12d to the management server 2 immediately after the event information is stored in the storage 12d. In this manner, when an event occurs, the control unit 11 temporarily stores the event information in the storage 12d, so that the event information can be prevented from missing even when transmission fails due to a failure in a communication environment of the network NW or the like.

Figure 3:
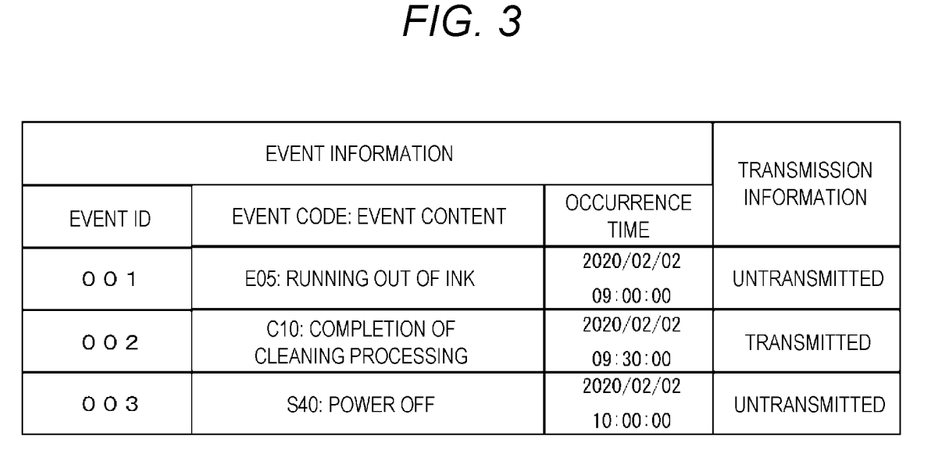
FIG. 3 is a diagram showing an example of event information stored in a storage.

FIG. 3 is a diagram showing an example of the event information stored in the storage 12d. The event information includes an event ID, an event code, and occurrence time. The event ID is information for identifying the event information. The event code is information indicating a content of an event. For example, an event code "E05" indicates "running out of ink", an event code "C10" indicates completion of a cleaning processing, and an event code "S40" indicates power off. The occurrence time is information indicating time when the event occurs. The control unit 11 according to the present embodiment stores date and time as the occurrence time as shown in the figure.

The control unit 11 adds transmission information to each piece of event information and stores the event information in the storage 12d. The transmission information is information indicating whether event information is transmitted or not transmitted to the management server 2. When the event information is not transmitted and when transmission of the event information fails, the control unit 11 sets the transmission information to "untransmitted". When the event information can be normally transmitted, the control unit 11 sets the transmission information to "transmitted". A method for using the transmission information will be described later.

Return to FIG. 2. The operation unit 13 is used by a user to perform various operations. For example, the operation unit 13 is used to set various types of information. The control unit 11 stores information set by the user in the setting information storage area 12c as setting information.

The printing unit 14 is a printing mechanism that performs printing on a print medium. The printing unit 14 includes an inkjet print head, a head drive mechanism, a print medium conveying mechanism, and the like.

The cleaning unit 15 performs the cleaning processing. As described above, the cleaning processing includes the flushing processing and the ink suction processing.

The communication unit 16 communicates with the management server 2 via the network NW.

Figure 4:
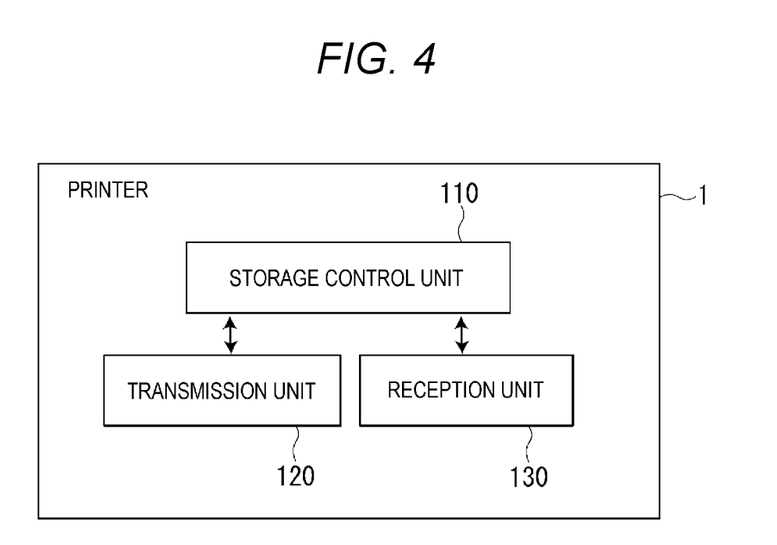
FIG. 4 is a block diagram showing a functional configuration of the printer.

Next, a functional configuration of the printer 1 will be described with reference to FIG. 4. The printer 1 includes a storage control unit 110, a transmission unit 120, and a reception unit 130.

When an event occurs, the storage control unit 110 immediately stores the event information including the event ID, the event code, and the occurrence time in the storage 12d. At this time, the storage control unit 110 adds transmission information to the event information and stores the event information in the storage 12d. The storage control unit 110 stores, in the storage 12d, transmitted event information that is the event information to which transmission information indicating the event information has been transmitted is added. When the reception unit 130 receives a reception response of the transmitted event information from the management server 2, the storage control unit 110 deletes the transmitted event information from the storage 12d.

In a power-off event, when the printer 1 is powered off, for example, when a power-off operation is performed, the storage control unit 110 stores event information indicating power off in the storage 12d before power off. In the example shown in FIG. 3, the event information of the event ID "003" is event information stored when the printer 1 is powered off.

The storage control unit 110 does not store the device information in the storage 12d.

The transmission unit 120 push-transmits the device information to the management server 2 in the regular transmission processing to be described later. The transmission unit 120 push-transmits the event information stored in the storage 12d to the management server 2. More specifically, among the event information stored in the storage 12d, the transmission unit 120 push-transmits, to the management server 2, untransmitted event information that is event information to which transmission information indicating the event information has not been transmitted is added in the regular transmission processing to be described later. The transmission unit 120 push-transmits the event information stored in the storage 12d to the management server 2 in the irregular transmission processing to be described later.

In the event information indicating power off, the transmission unit 120 push-transmits the event information stored in the storage 12d to the management server 2 when the printer 1 is powered on. At this time, the transmission unit 120 may push-transmit the event information indicating power on to the management server 2 together with the event information indicating power off.

The transmission unit 120 retransmits the event information when the event information cannot be transmitted, but does not retransmit the device information. When the device information cannot be transmitted in the regular transmission processing, the transmission unit 120 transmits the device information at that time point in a subsequent regular transmission processing.

The reception unit 130 receives, from the management server 2, a reception response indicating that the management server 2 has received the event information. The reception unit 130 receives, from the management server 2, a reception response indicating that the management server 2 has received the device information. When a reception response of the device information is received from the management server 2, the transmission unit 120 push-transmits the untransmitted event information to the management server 2 in the regular transmission processing to be described later.

Figure 5:
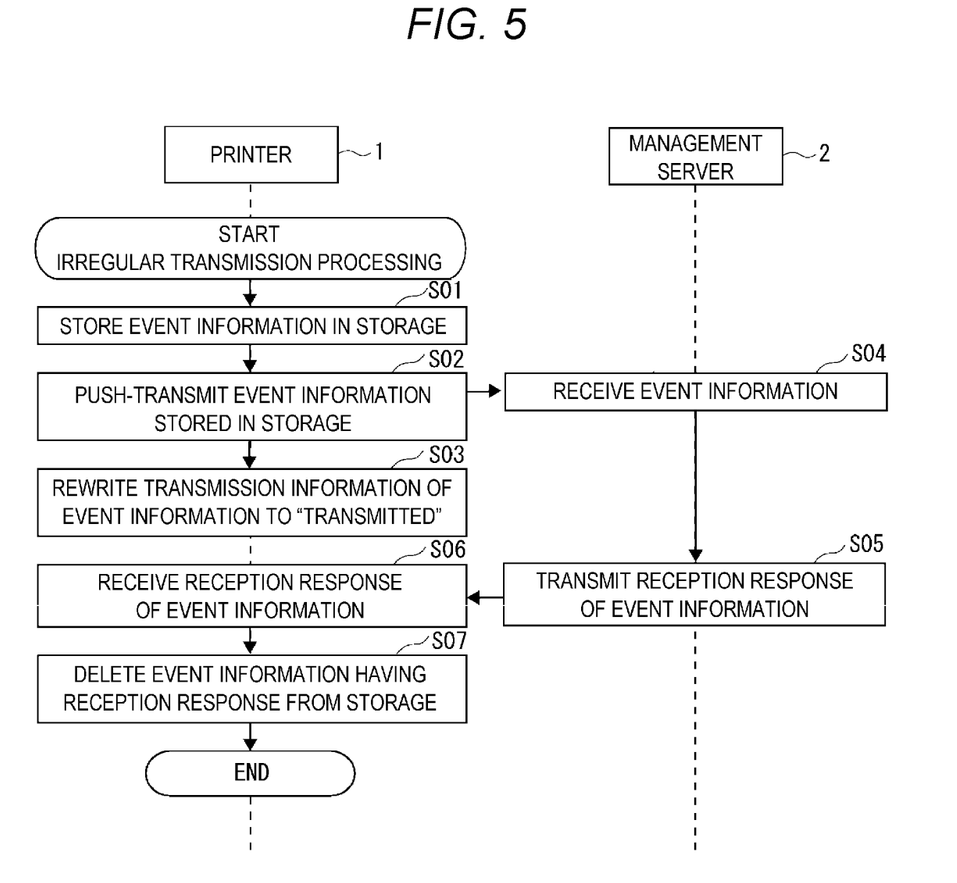
FIG. 5 is a flowchart showing a flow of an irregular transmission processing.

Next, the irregular transmission processing and the regular transmission processing will be described with reference to FIGS. 5 and 6. FIG. 5 is a flowchart showing a flow of the irregular transmission processing. The irregular transmission processing is started in response to an occurrence of an event in the printer 1.

In S01, the printer 1 stores event information indicating an event that has occurred in the storage 12d. At this time, the printer 1 adds transmission information indicating "untransmitted" to the event information.

In S02, the printer 1 push-transmits the event information stored in the storage 12d to the management server 2. The printer 1 performs S02 immediately after the event information is stored in the storage 12d in S01. In step S02, the printer 1 push-transmits all event information stored in the storage 12d to the management server 2. For example, when the event information shown in FIG. 3 is stored in the storage 12d, the printer 1 transmits event information of the event IDs "001", "002", and "003". The printer 1 transmits these pieces of event information in an order of, for example, event IDs.

In S03, the printer 1 rewrites the transmission information of the event information to "transmitted". For example, when the event information of the event IDs "001", "002", and "003" shown in FIG. 3 is transmitted to the management server 2, the printer 1 rewrites the transmission information to "transmitted" for the event information of the event IDs "001" and "003" whose transmission information is "untransmitted".

In step S04, the management server 2 receives the event information transmitted from the printer 1 in step S02.

In S05, the management server 2 transmits a reception response of the event information to the printer 1. The reception response of the event information includes an event ID and an event information reception signal indicating reception of the event information.

In S06, the printer 1 receives the reception response of the event information transmitted from the management server 2.

In S07, the printer 1 deletes the event information having the reception response from the storage 12d. That is, the printer 1 deletes the event information of an event ID included in the reception response from the storage 12d.

Figure 6:
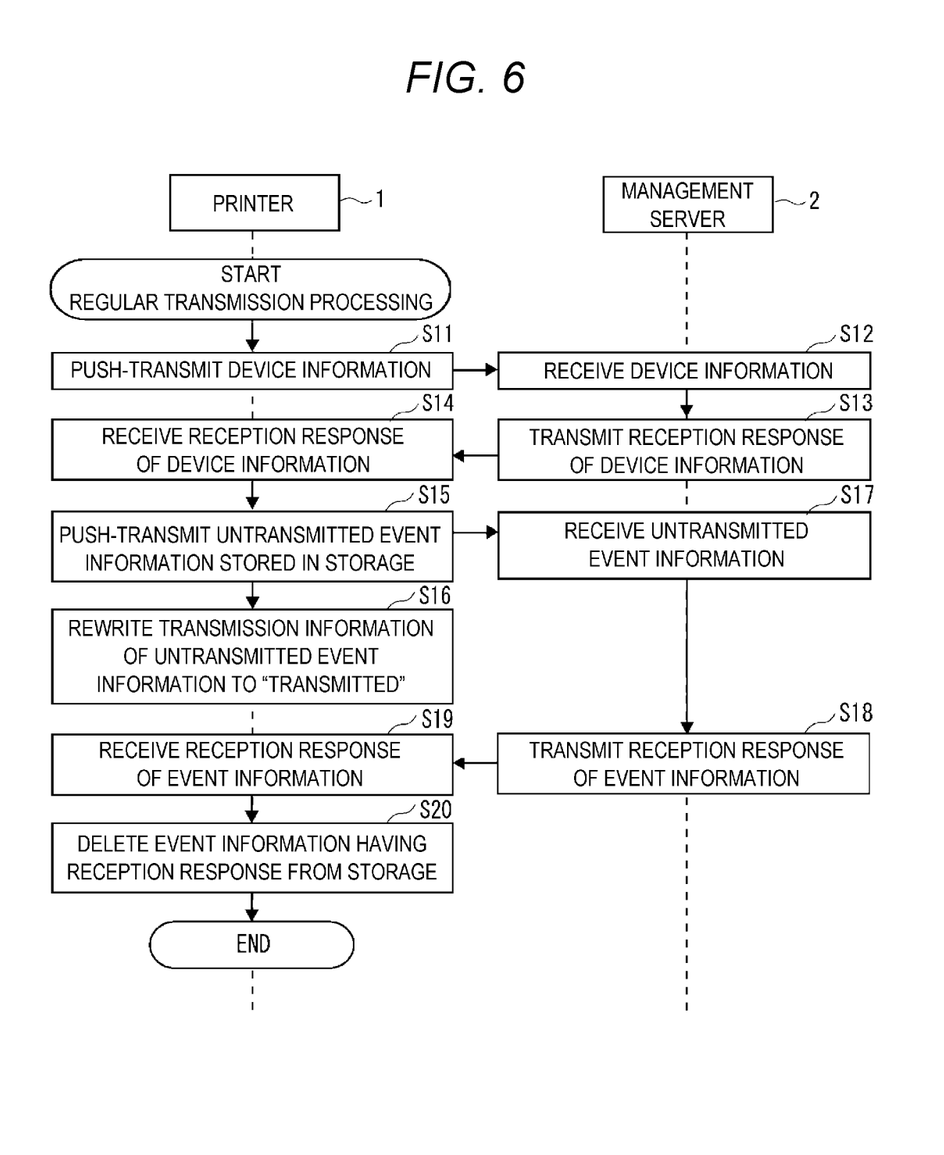
FIG. 6 is a flowchart showing a flow of a regular transmission processing.

FIG. 6 is a flowchart showing a flow of the regular transmission processing. The regular transmission processing is performed regularly. The printer 1 starts the regular transmission processing by using start timing or end timing of a predetermined cycle such as one hour or one day as a trigger.

In S11, the printer 1 push-transmits the device information to the management server 2. The printer 1 push-transmits, to the management server 2, the information based on the measurement values stored in the measurement value storage area 12b, that is, the consumable information, the actual usage information, and the setting information stored in the setting information storage area 12c as the device information. The device information transmitted to the management server 2 includes transmission time of the device information.

In S12, the management server 2 receives the device information transmitted from the printer 1.

In S13, the management server 2 transmits a reception response of the device information to the printer 1. The reception response of the device information includes a device information reception signal indicating reception of the device information.

In S14, the printer 1 receives the reception response of the device information transmitted from the management server 2.

In S15, the printer 1 push-transmits the untransmitted event information stored in the storage 12d to the management server 2. For example, when the event information shown in FIG. 3 is stored in the storage 12d, the printer 1 transmits the event information of the event IDs "001" and "003".

In S16, the printer 1 rewrites transmission information of the untransmitted event information to "transmitted". For example, when the event information of the event IDs "001" and "003" shown in FIG. 3 is transmitted to the management server 2, the printer 1 rewrites transmission information of the event information to "transmitted".

In S17, the management server 2 receives the untransmitted event information transmitted from the printer 1 in S15.

In S18, the management server 2 transmits a reception response of the event information to the printer 1. The reception response of the event information includes an event ID and an event information reception signal indicating reception of the event information.

In S19, the printer 1 receives the reception response of the event information transmitted from the management server 2.

In S20, the printer 1 deletes the event information having the reception response from the storage 12d. That is, the printer 1 deletes the event information of an event ID included in the reception response from the storage 12d.

As described above, when an event occurs, the printer 1 according to the present embodiment push-transmits, to the management server 2, the event information indicating a content of the event that has occurred and time when the event occurs, so that the management server 2 can grasp occurrence of the event in the printer 1 without requesting transmission of the event information. In particular, since the event information includes information indicating time when the event occurs, the management server 2 can grasp the event occurred in the printer 1 in time series. When an event occurs, the printer 1 temporarily stores the event information in the storage 12d, and immediately thereafter, push-transmits the event information stored in the storage 12d to the management server 2, so that the event information can be prevented from missing even when transmission fails.

Since the printer 1 push-transmits the untransmitted event information stored in the storage 12d to the management server 2 in the regular transmission processing, the event information can be reliably transmitted to the management server 2 even when transmission of the event information fails.

Since the printer 1 push-transmits the event information stored in the storage 12d to the management server 2 in the irregular transmission processing, the management server 2 can reliably receive transmitted event information.

When the printer 1 receives a reception response from the management server 2, the printer 1 deletes the event information having the reception response from the storage 12d, so that transmission of the event information can be prevented from being unnecessarily repeated.

When the printer 1 receives a reception response of the device information from the management server 2, that is, when the printer 1 can reliably communicate with the management server 2, the printer 1 push-transmits the untransmitted event information stored in the storage 12d to the management server 2, so that the event information can be more reliably transmitted to the management server 2.

When event information indicating power off is stored in the storage 12d and the printer 1 is powered on, the printer 1 push-transmits the event information stored in the storage 12d to the management server 2, so that the management server 2 can grasp occurrence time of power off in the printer 1.

The following modifications can be made regardless of the embodiment described above. The modifications can be appropriately combined.

First Modification

In S15 in FIG. 6, the printer 1 may push-transmit not only the untransmitted event information stored in the storage 12d but also the transmitted event information to the management server 2. According to this configuration, since the printer 1 repeats transmission of the event information in the regular transmission processing as long as the printer 1 does not receive the reception response of the event information, the management server 2 can reliably receive the transmitted event information.

Second Modification

When a plurality of pieces of event information are stored in the storage 12d, the printer 1 may determine a transmission order of the plurality of pieces of event information according to events. In this case, a priority of the event information may be determined according to events. When a plurality of pieces of event information are stored in the storage 12d, the printer 1 may push-transmit the plurality of pieces of event information stored in the storage 12d to the management server 2 in an order according to a priority determined for the event information. It is preferable to set a priority of the event information to be high for event information indicating an event related to an error. The printer 1 determines whether the event information indicates an event related to an error according to an event code included in the event information, and first transmits the event information indicating the event related to an error. After the printer 1 transmits the event information indicating the event related to an error, the printer 1 transmits event information indicating other events.

According to this configuration, since the printer 1 push-transmits the plurality of pieces of event information to the management server 2 in an order according to the priority determined for the event information, the management server 2 can grasp an event having a high priority in an earlier stage.

Third Modification

The printer 1 may retry push-transmission of the event information. The printer 1 may retry push-transmission of first event information having high priority when the push-transmission of the first event information to the management server 2 fails and may not retry push-transmission of second event information having a lower priority than the first event information when the push-transmission of the second event information to the management server 2 fails. According to this configuration, the printer 1 can more reliably transmit event information having high priority to the management server 2.

Fourth Modification

The priority of the event information in the second modification and the third modification may be determined according to occurrence time included in the event information. For example, the priority of the event information having early occurrence time may be high. Alternatively, the priority of the event information may be set by the user. For example, the priority of the event information indicating power on or power off may be set to be high. The priority is not limited to two stages, and may be set in three or more stages.

Fifth Modification

In the regular transmission processing, the printer 1 may push-transmit the untransmitted event information to the management server 2 before transmitting the device information instead of receiving the reception response of the device information from the management server 2. Alternatively, the printer 1 may push-transmit the untransmitted event information to the management server 2 after the device information is transmitted and before the reception response of the device information is received. That is, the printer 1 can transmit the untransmitted event information to the management server 2 accompanying with the transmission of the device information.

Sixth Modification

The above-described embodiment may be applied to an image processing device other than the printer 1. Examples of the image processing device include a scanner device, a copy device, and a FAX device. Alternatively, the image processing device may be a multifunction machine having a printer function, a scanner function, a copy function, and a FAX function.

Seventh Modification

The embodiment and the modifications have been described above, and the embodiment and the modifications may be combined. Other modifications may be made without departing from the scope of the disclosure.

APPENDIX

Hereinafter, an image processing device and a control method of an image processing device will be described.

The printer 1 is connected to the management server 2 via the network NW, and includes the storage control unit 110 that when an event occurs, stores in the storage unit 12 event information indicating a content of the event that has occurred and time when the event occurs, and the transmission unit 120 that push-transmits the event information stored in the storage unit 12 to the management server 2.

A control method of the printer 1 is a method for controlling the printer 1 connected to the management server 2 via the network NW. The control method of the printer 1 includes, when an event occurs, storing in the storage unit 12 event information indicating a content of the event that has occurred and time when the event occurred, and push-transmitting the event information stored in the storage unit 12 to the management server 2.

According to this configuration, since the printer 1 push-transmits the event information indicating the content of the event that has occurred and the time when the event occurred to the management server 2, the management server 2 can grasp an occurrence of the event in the printer 1 without requesting transmission of the event information. When an event occurs, the printer 1 temporarily stores the event information in the storage unit 12, and then push-transmits the event information stored in the storage unit 12 to the management server 2, so that the event information can be prevented from missing even when transmission fails.

In the printer 1, the storage control unit 110 may add, to the event information, transmission information indicating whether the event information is transmitted or not transmitted to the management server 2 and store the event information in the storage unit 12, and among the event information stored in the storage unit 12, the transmission unit 120 may push-transmit, to the management server 2, untransmitted event information that is event information to which transmission information indicating the event information has not been transmitted is added.

According to this configuration, since the printer 1 push-transmits the untransmitted event information to the management server 2 among the event information stored in the storage unit 12, the event information can be transmitted to the management server 2 even when transmission fails.

The printer 1 further includes the reception unit 130 that receives, from the management server 2, a reception response indicating that the management server 2 has received the event information. The storage control unit 110 may store, in the storage unit 12, transmitted event information that is event information to which transmission information indicating the event information has been transmitted is added, and when a reception response of the transmitted event information is received from the management server 2, the storage control unit 110 may delete the transmitted event information from the storage unit 12.

According to this configuration, when the printer 1 receives the reception response from the management server 2, the printer 1 deletes the transmitted event information corresponding to the reception response from the storage unit 12, so that the event information can be prevented from being transmitted for a plurality of times to the management server 2.

In the printer 1, the transmission unit 120 may regularly push-transmit the device information indicating a state of the printer 1 to the management server 2, and may push-transmit the untransmitted event information stored in the storage unit 12 to the management server 2 accompanying with the transmission of the device information.

According to this configuration, since the printer 1 regularly transmits the device information to the management server 2 and push-transmits the untransmitted event information stored in the storage unit 12 to the management server 2 accompanying with the transmission of the device information, the printer 1 can transmit the event information at the time of transmitting a subsequent piece of device information even when transmission of the event information fails.

In the printer 1, the reception unit 130 receives, from the management server 2, a reception response indicating that the management server 2 has received the device information, and when the reception response of the device information is received from the management server 2, the transmission unit 120 may push-transmit the untransmitted event information stored in the storage unit 12 to the management server 2.

According to this configuration, when the printer 1 receives the reception response of the device information from the management server 2, the printer 1 push-transmits the untransmitted event information stored in the storage unit 12 to the management server 2, so that the event information can be reliably transmitted.

In the printer 1, the transmission unit 120 may push-transmit the untransmitted event information and the transmitted event information that are stored in the storage unit 12 to the management server 2 when the reception response of the device information is received from the management server 2.

According to this configuration, when the printer 1 receives the reception response of the device information from the management server 2, the printer 1 push-transmits the untransmitted event information and the transmitted event information that are stored in the storage unit 12 to the management server 2, so that the management server 2 can reliably receive the event information.

In the printer 1, the storage unit 12 may be a non-volatile storage device. When the printer 1 is powered off, the storage control unit 110 may store event information indicating power off in the storage unit 12 before power off, and when the printer 1 is powered on, the transmission unit 120 may push-transmit the event information stored in the storage unit 12 to the management server 2.

According to this configuration, since the printer 1 stores the event information indicating power off in the storage unit 12 and push-transmits the event information stored in the storage unit 12 to the management server 2 when the printer 1 is powered on, the management server 2 can grasp occurrence time of power off in the printer 1.

In the printer 1, a priority of the event information may be determined according to events, and when the plurality of pieces of event information are stored in the storage unit 12, the transmission unit 120 may push-transmit the plurality of pieces of event information to the management server 2 in an order according to the priority determined for the event information.

According to this configuration, since the printer 1 push-transmits the plurality of pieces of event information to the management server 2 in an order according to the priority determined for the event information, the management server 2 can grasp an event having a high priority in an earlier stage.

In the printer 1, the transmission unit 120 may retry push-transmission of first event information when the push-transmission of the first event information to the management server 2 fails and may not retry push-transmission of second event information having a lower priority than the first event information when the push-transmission of the second event information to the management server 2 fails.

According to this configuration, the printer 1 retries the push-transmission of the first event information when transmission of the first event information fails and does not retry the push-transmission of the second event information having a lower priority than the first event information when transmission of the second event information fails, so that the first event information having a high priority can be more reliably transmitted to the management server 2.

What is claimed is:

1. A control method of an image processing device connected to a management server via a network, the control method comprising:
   when an event occurs, storing in a storage unit event information indicating a content of the event that occurred and time when the event occurs wherein event information includes error information, cleaning information, or job information;
   push-transmitting the event information stored in the storage unit to the management server wherein the push-transmission is a transmission of information initiated spontaneously by the image processing device;
   regularly push-transmitting device information indicating a state of the image processing device to the management server;
   receiving, from the management server, a reception response indicating that the management server received the device information indicating a state of the image processing device; and
   when the reception response of the device information is received from the management server, push-transmitting untransmitted event information or transmitted event information that are stored in the storage unit to the management server.

2. The control method of an image processing device according to claim 1, further comprising:
   adding to the event information, transmission information indicating whether the event information was transmitted or untransmitted to the management server and stores the event information in the storage unit, and
   push-transmitting, to the management server, untransmitted event information that is event information to which transmission information indicating the event information was untransmitted is added.

3. The control method of an image processing device according to claim 2, further comprising:
   receiving from the management server, a reception response indicating that the management server received the event information; and
   storing transmitted event information that is event information to which transmission information indicating the event information was transmitted is added, and deletes the transmitted event information from the storage unit when a reception response of the transmitted event information is received from the management server.

4. The control method of an image processing device according to claim 3, further comprising:
   regularly push-transmitting device information indicating a state of the image processing device to the management server; and
   push-transmitting the untransmitted event information stored in the storage unit to the management server accompanying with the transmission of the device information.

5. The control method of an image processing device according to claim 4, further comprising:
   receiving, from the management server, a reception response indicating that the management server received the device information; and
   when the reception response of the device information is received from the management server, push-transmitting the untransmitted event information stored in the storage unit to the management server.

6. The control method of an image processing device according to claim 1, further comprising:
   storing, when the image processing device is powered off, the event information indicating power off in the storage unit before power off; and
   when the image processing device is powered on, push-transmitting the event information stored in the storage unit to the management server.

7. The control method of an image processing device according to claim 1, further comprising:
   determining a priority of the event information according to events; and
   when a plurality of pieces of event information are stored in the storage unit, push-transmitting the plurality of pieces of event information to the management server in an order according to the priority determined for the event information.

8. A control method of an image processing device connected to a management server via a network, the control method comprising:

when an event occurs, storing in a storage unit event information indicating a content of the event that occurred and time when the event occurs wherein event information includes error information, cleaning information, or job information;

push-transmitting the event information stored in the storage unit to the management server wherein the push-transmission is a transmission of information initiated spontaneously by the image processing device;

determining a priority of the event information according to events;

when a plurality of pieces of event information are stored in the storage unit, push-transmitting the plurality of pieces of event information to the management server in an order according to the priority determined for the event information;

retrying a push-transmission of first event information when the push-transmission of the first event information to the management server fails; and refraining from retrying push-transmission of second event information having a lower priority than the first event information when the push-transmission of the second event information to the management server fails.

* * * * *